US010417827B2

United States Patent
Pahud et al.

(10) Patent No.: US 10,417,827 B2
(45) Date of Patent: Sep. 17, 2019

(54) SYNDICATION OF DIRECT AND INDIRECT INTERACTIONS IN A COMPUTER-MEDIATED REALITY ENVIRONMENT

(71) Applicant: MICROSOFT TECHNOLOGY LICENSING, LLC, Redmond, WA (US)

(72) Inventors: Michel Pahud, Kirkland, WA (US);
Nathalie Riche, Issaquah, WA (US);
Eyal Ofek, Redmond, WA (US);
Christophe Hurter, Toulouse (FR)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 54 days.

(21) Appl. No.: 15/586,570

(22) Filed: May 4, 2017

(65) Prior Publication Data
US 2018/0322701 A1 Nov. 8, 2018

(51) Int. Cl.
*G06T 3/60* (2006.01)
*G06T 19/00* (2011.01)
(Continued)

(52) U.S. Cl.
CPC ........ *G06T 19/006* (2013.01); *G02B 27/0172* (2013.01); *G06F 3/011* (2013.01);
(Continued)

(58) Field of Classification Search
CPC ........... G06T 19/006; G06T 3/20; G06T 3/60; G06T 3/40; G02B 27/0172;
(Continued)

(56) References Cited

U.S. PATENT DOCUMENTS 9,292,184 B2  3/2016  Hosenpud et al.
2008/0225007 A1*  9/2008  Nakadaira ........... G06F 3/03545
345/173
(Continued)

FOREIGN PATENT DOCUMENTS

EP          3163426 A1    5/2017
WO    2015046674 A1    4/2015
WO    2016153618 A1    9/2016

OTHER PUBLICATIONS

Lin, et al., "Towards Naturally Grabbing and Moving Objects in VR", In Electronic Imaging, Feb. 14, 2016, 6 pages.
(Continued)

*Primary Examiner* — Tapas Mazumder
(74) *Attorney, Agent, or Firm* — Shook, Hardy & Bacon, L.L.P.

(57) ABSTRACT

In various embodiments, computerized methods and systems for syndicating direct and indirect interactions with objects in a computer-mediated environment to facilitate precise interactions with the objects in the computer-mediated environment are provided. The system detects a direct interaction with an object in the computer-mediated reality environment. The direct interaction may be a natural or hypernatural interaction. Subsequently, the system may determine various options of indirect interaction with the object related to the direct interaction. The indirect interaction may be generated by a controller. Upon receiving an indirect interaction, the system may modify the object based on the syndication of the direct interaction and the indirect interaction.

20 Claims, 9 Drawing Sheets

(51) Int. Cl.
    *G06F 3/0482* (2013.01)
    *G06F 3/01* (2006.01)
    *G02B 27/01* (2006.01)
    *G06F 3/038* (2013.01)
    G06T 3/40 (2006.01)
    G06T 3/20 (2006.01)
    G06F 3/033 (2013.01)

(52) U.S. Cl.
    CPC .............. *G06F 3/016* (2013.01); *G06F 3/017* (2013.01); *G06F 3/038* (2013.01); G02B 2027/014 (2013.01); G02B 2027/0118 (2013.01); G02B 2027/0127 (2013.01); G02B 2027/0141 (2013.01); G02B 2027/0178 (2013.01); G06F 3/013 (2013.01); G06F 3/014 (2013.01); G06F 3/033 (2013.01); G06F 3/0482 (2013.01); G06F 2203/0381 (2013.01); G06F 2203/04806 (2013.01); G06T 3/20 (2013.01); G06T 3/40 (2013.01); G06T 3/60 (2013.01)

(58) Field of Classification Search
    CPC ...... G02B 2027/0127; G02B 2027/014; G02B 2027/0178; G02B 2027/0118; G06F 3/016; G06F 3/017; G06F 3/0482; G06F 3/033; G06F 3/013
    See application file for complete search history.

(56) References Cited

U.S. PATENT DOCUMENTS

| | | | |
|---|---|---|---|
| 2011/0175932 A1 | 7/2011 | Yu et al. | |
| 2011/0304557 A1 | 12/2011 | Wilburn et al. | |
| 2012/0113223 A1* | 5/2012 | Hilliges | G06F 3/00 348/46 |
| 2013/0117715 A1* | 5/2013 | Williams | G06F 3/04883 715/835 |
| 2013/0207962 A1* | 8/2013 | Oberdorfer | G06F 3/013 345/419 |
| 2014/0015831 A1 | 1/2014 | Kim et al. | |
| 2014/0160046 A1* | 6/2014 | Kawamoto | H04N 1/00411 345/173 |
| 2014/0253486 A1* | 9/2014 | Luo | G06F 3/0488 345/173 |
| 2014/0267599 A1 | 9/2014 | Drouin et al. | |
| 2014/0368428 A1 | 12/2014 | Pinault | |
| 2015/0268821 A1 | 9/2015 | Ramsby et al. | |
| 2016/0025981 A1 | 1/2016 | Burns et al. | |
| 2016/0180595 A1 | 6/2016 | Grossinger et al. | |
| 2016/0299565 A1 | 10/2016 | Sudarsky | |
| 2017/0024935 A1 | 1/2017 | Baba | |
| 2017/0069122 A1 | 3/2017 | Lee et al. | |
| 2017/0270362 A1* | 9/2017 | Barnehama | G06F 1/163 |
| 2018/0160881 A1* | 6/2018 | Okabe | A61B 1/00 |

OTHER PUBLICATIONS

Berge, et al., "Design and Evaluation of an "Around the SmartPhone" Technique for 3D Manipulations on Distant Display", In Proceedings of the 3rd ACM Symposium on Spatial User Interaction, Aug. 8, 2015, 10 pages.

Rodriguez, et al., "Smartphone-based Remote 3D Interaction for Digital Heritage Applications", In Proceedings of IEEE Digital Heritage, vol. 1, Sep. 28, 2015, 4 pages.

Agrawal, et al., "Poster: Evaluation of an Approach for Remote Object Manipulation Utilizing Dynamic Magnifying Lenses", In Proceedings of IEEE Symposium on 3D User Interfaces, Mar. 8, 2008, pp. 169-170.

Lee, et al., "Using a mobile device as an interface tool for HMD-based AR applications", In Proceedings of the ACM SIGCHI International Conference on Advances in computer entertainment technology, Jun. 14, 2006, 5 Pages.

"International Search Report & Written Opinion issued in PCT Application No. PCT/US2018/028221", dated Jul. 3, 2018, 15 Pages.

* cited by examiner

SYNDICATION OF DIRECT AND INDIRECT INTERACTIONS IN A COMPUTER-MEDIATED REALITY ENVIRONMENT

BACKGROUND

Computer-mediated reality (CMR) refers to one's perception of reality being mediated through the use of a computing device, e.g., a wearable computer or handheld device. Typically, the computing device mediates the user's visual perception of the environment. Various CMR technologies, such as virtual reality (VR), augmented reality (AR), and mixed reality (MR), enable users to view and perceive computer-generated two-dimensional (2D) objects and three-dimensional (3D) objects, as if the objects were actually present within the user's perceived environment. Advancements in computing have fueled tremendous development efforts to apply these technologies to both entertainment and enterprise marketplaces.

Interaction with objects in a CMR environment is often cumbersome and error prone. Reaching with hands into the CMR environment can be exhaustive, in particular if the hands had to be held in midair. Further, it is difficult for users to accurately express their intention through the interaction with computer-generated objects. Further, users may not receive effective tactile feedback for the interaction, making accurate interaction more difficult, and potentially erroneous. To this end, the user may be unaware of the need to adjust the manner of interaction. In some instances, the computing device may misunderstand the user's intention and erroneously react to the user's interaction, e.g., to mediate the CMR environment differently from the user's preference.

SUMMARY

Embodiments described herein provide methods and systems for syndicating direct and indirect interactions in CMR environments. More specifically, a syndicate of direct and indirect interactions related to an object in a CMR environment is utilized to further mediate the CMR environment.

In various embodiments, a direct interaction (e.g., a natural or hypernatural interaction) with an object in the CMR environment is received by a computing device configured to mediate the CMR environment. The computing device may determine one or more options for also indirectly interacting with the object based at least in part on a characteristic of the direct interaction, e.g., a property of the object, the manner of the interaction, or related contextual information. Based on the characteristic of the direct interaction, the computing device can determine one or more options for indirectly interacting with the object. Optionally, the computing device may augment the CMR environment with a presentation of these options for indirect interaction, e.g., to guide the user in indirectly interacting with the object. Upon receiving a signal indicating at least one option of indirect interaction, the computing device may modify the CMR environment according to the syndication of the direct interaction and the indirect interaction.

To this end, disclosed methods and systems for syndicating direct and indirect interactions enable not only intuitive direct interactions with objects in CMR environments, but also enable syndicated indirect interactions, to enable the computing device to better understand the user's intention, and accordingly quickly modify one or more objects in the CMR environment with precision.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
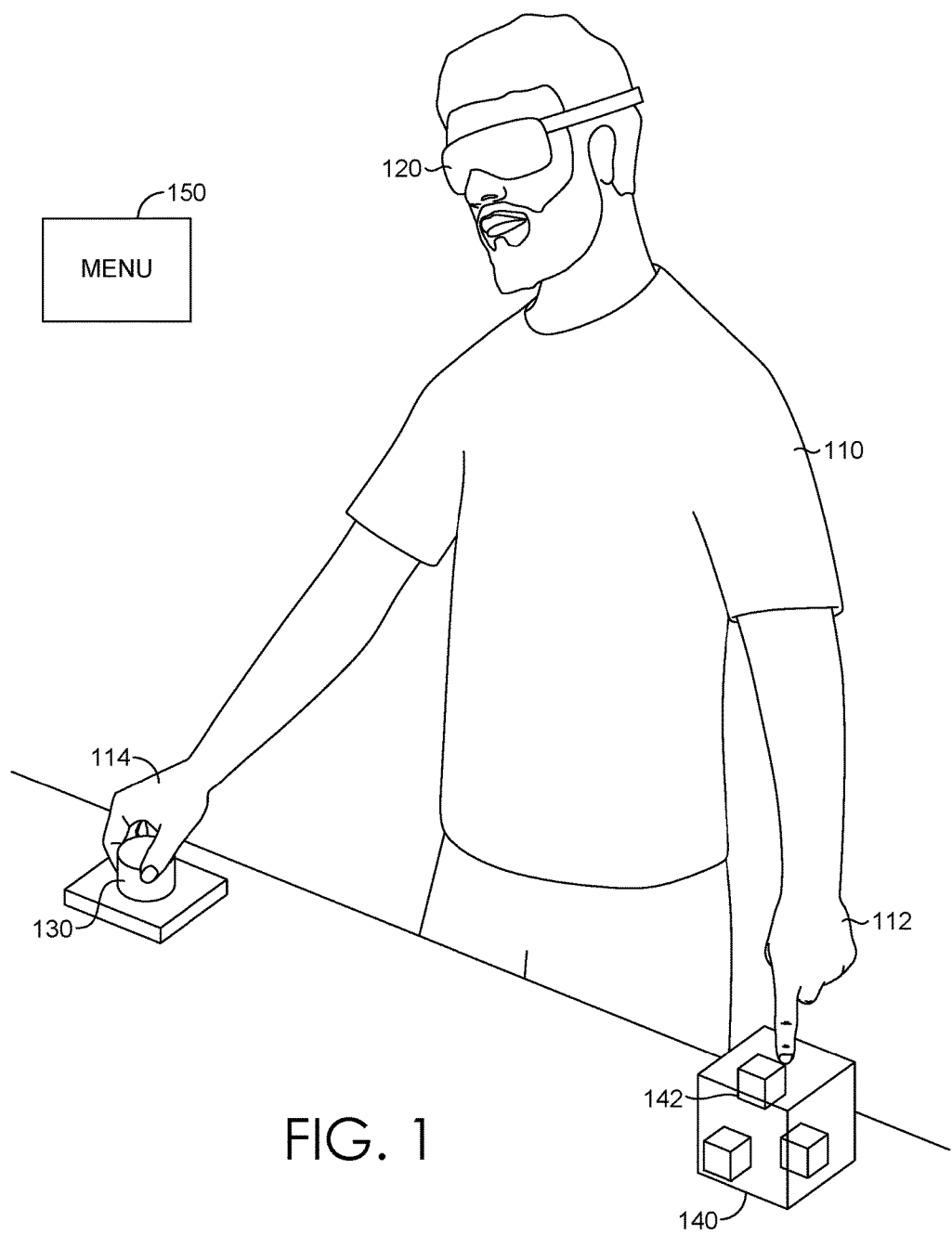
FIG. 1 is a schematic showing an exemplary system for syndicating direct and indirect interactions in a CMR environment, in accordance with some embodiments of the present disclosure.

In accordance with embodiments described herein, the CMR environment can include any one of a virtual reality (VR) environment, an augmented reality (AR) environment, and a mixed reality (MR) environment, each of which are at least partially rendered by one or more computing devices and provided for immersive display to a user. The term "environment" can reference a portion of or an entire collection of rendered objects available for perceivable display to the user. For instance, in a fully virtual environment (e.g., VR), the environment can reference one or more sets of rendered objects, a rendered background or particle system, or any portion and/or combination thereof. In a partially virtual environment (e.g., AR or MR), the environment can reference one or more sets of rendered objects, a particle system, a real-world space or backdrop, or any portion and/or combination thereof.

CMR technologies can enable the realistic perception of computer-generated 3D objects and, in some configurations, can enable perceived interactivity with these objects. There are three major design approaches that exist in 3D interaction research: naturalism (i.e., "natural"), magic, and hypernatural. "Naturalism attempts to design interaction techniques to work exactly the way the real world works or at least as close as is practically possible. Magic techniques try to enhance usability and performance by giving the user new abilities and non-natural methods for performing tasks. Hypernatural techniques are magic techniques that use natural movements but make them more powerful by giving the user new abilities or intelligent guidance. Increased interaction fidelity is what distinguishes hypernatural techniques from standard magic techniques." R. P. McMahan, Kopper, R., and Bowman, D. A., "Principles for Designing Effective 3D Interaction Techniques," in *Handbook of Virtual Environments: Design, Implementation, and Applications,* 2nd ed., K. Hale and Stanney, K. Boca Raton, Fla. CRC Press, 2015, pp. 285-311.

In dynamic and constantly changing CRM environments, it is important to provide users with intuitive modes of interaction with precision in controllability. Each different interaction technique has its advantages and disadvantages. A natural interaction with 3D objects has the advantage of being familiar to users because it corresponds to how we interact with objects in the real world. However, interacting with 3D objects that appear out of arm's reach can be difficult for natural interaction techniques. Additionally, the virtual objects that users are manipulating have no passive or active haptic feedback. At a distance, hypernatural or magic interaction methodologies are generally better than the natural interaction methodology. Ray casting, by way of example, is a feature typically employed by various hypernatural interaction methodologies for interacting with distant objects. With ray casting, a virtual light ray of sorts, projected from a user's hand or head, for example, can enable the user to interact with objects that are far away or out of arm's reach.

For purposes of the present disclosure, the hypernatural and magic interaction methodologies will be grouped together and referenced as hypernatural interaction techniques. It is contemplated, however, that in some embodiments the magic and hypernatural interaction techniques can be distinguished and considered as distinctive interaction techniques, and any reference to a hypernatural interaction technique could be referencing any individual one, or both of, the magic and hypernatural interaction methodologies.

Direct interaction, as discussed in the present disclosure, refers to the interaction that the operator (e.g., a finger) or an extension thereof (e.g., a virtual light ray of the finger) will directly intersect with the target object (e.g., a 3D virtual object) in a CMR environment. Direct interaction may include natural interaction or hypernatural interaction techniques.

However, direct interactions alone are usually ambiguous and also lack precision. As an example, a direct interaction of grabbing a virtual object may be interpreted as a selection or a squeezing of the virtual object. If the user's intent is to squeeze the virtual object, it would be difficult for a computing device to determine the intended force associated with the squeeze. As another example, a direct interaction of touching a virtual object may be interpreted as a selection or a pushing of the virtual object. If the user's intent is to push the virtual object, a computing device may not be able to determine the force with which the virtual object was pushed, and thereby determine the resulting distance that the object was pushed. In both examples, since the virtual object, unlike a physical object, cannot form an action-reaction force pair based on the direct interaction, the user also cannot receive tactile feedback from the direct interaction.

Conversely, indirect interaction, as discussed in the present disclosure, refers to the interaction that the operator (e.g., a controller device) will only indirectly interact with the target object (e.g., a 3D virtual object) in a CMR environment via signals, e.g., electrical signals, optical signals, or radio signals. In various embodiments, indirect interaction is based on controller devices, such as a remote control or a joystick, by way of example. That is, input devices (or "controllers"), such as mice, keyboards, joysticks, virtual reality controllers, touchpads, and the like, are utilized to generate controlling signals to indirectly interact with intended targets in the CMR environment. While controllers are typically utilized for gaming applications, they can be used in any type of application for conducting basic to advanced interactions with rendered objects. Advantageously, controllers can be used to disambiguate the user intention, e.g., via a selection from a host of options. Further, controllers can provide precise control of the magnitude of the controlling signals, e.g., the voltage level or the time of electrical signals.

Embodiments of the present disclosure provide systems and methods for syndicating both direct and indirect interactions with objects in a CMR environment. In other words, a user can interact naturally with a target object in the CMR environment using direct interaction techniques. Meanwhile, the user can also use indirect interaction techniques to more precisely control the reaction of the target object pertaining to the user's intent associated with the direct interaction. In various embodiments, the syndicate of the direct and indirect interactions is used to modify the target object or the CMR environment in general.

By way of example, a direct interaction with an object in the CMR environment may be received by a computing device configured to mediate the CMR environment. The computing device may then determine one or more options of indirect interaction with the object based at least in part on a characteristic of the direct interaction, such as the point of interaction, e.g., the corner, the edge, the surface, or the interior of the object. Based on the characteristic of the direct interaction, the computing device can determine one or more available options for indirectly interacting with the object. For instance, the direct interaction can select a particular object, while the indirect action modifies its position (e.g., facilitates a linear movement) or modifies its orientation (e.g., facilitates a rotational movement).

Optionally, the computing device may augment the CMR environment with a presentation of these options of indirect interaction, e.g., to guide the user on available indirect interactions with the object. These options may be based on the available devices connected or in communication with the head-mounted display (HMD) device, the context, the VR objects selected, etc. Upon receiving a signal indicating at least one option of indirect interaction (e.g., a linear movement), the computing device may modify the CMR environment according to the syndicate of the direct interaction and the indirect interaction. In this case, the syndicate may be a composite command of moving an object of the CMR environment in a certain direction, and in some embodiments, with a specific distance.

With reference now to FIG. 1, an exemplary system for syndicating direct and indirect interactions in a CMR environment is provided, in accordance with some embodiments of the present disclosure. In this CMR environment, head-mounted display (HMD) device 120 enables user 110 to see virtual object 140. User 110 may interact with virtual object 140 directly. By way of example, left hand 112 may reach the location of feature 142 of virtual object 140, or move around feature 142 in a certain direction. After HMD device 120, and/or a computing device (e.g., stationary sensors in the room, hand wearable devices, etc.) connected or in communication with the HMD device 120, detects this direct interaction, HMD device 120 may cause menu 150 to be presented to user 110. Menu 150 may present several options of indirect interaction with feature 142 or virtual object 140 in general. For example, options of indirect interaction with feature 142 may include change colors, change orientation, change size (e.g., zoom in or zoom out), change shape, move, rotate, twist, bend, etc. Similar or different options of indirect interaction with virtual object 140 may also be presented in menu 150.

In some embodiments, menu 150 is optional. After HMD device 120 detects a direct interaction, HMD device 120 causes a default behavior associated with the detected direct interaction to be activated. The default behavior associated with the detected direct interaction may depend on the context and the characteristics of the direct interaction.

User 110 may use another hand 114 to operate controller 130, e.g., to select a menu item from menu 150, and to provide a signal of indirect interaction to HMD device 120. Although controller 130 is shown as a dial in FIG. 1, controller 130 could be in a variety of form factors, e.g., a slate, a joystick, a touchpad, a display, a mouse, a keyboard, a VR controller, and the like. User 110 may use a display with a touchscreen as a controller. User 110 may use gestures to interact with controller 130, such as hovering over a slate or a smartphone with hand/finger gestures.

In some embodiments, multiple controllers are used separately or simultaneously for indirect interaction. By way of example, each controller is used to manipulate a particular property of the selected virtual object, such as a dial being used to rotate the virtual object, a slider being used to replace the virtual object with the next one in a row, a slate being used to resize the virtual object, and a stylus being used to reshape the virtual object.

In some embodiments, controller 130 is a wearable device, e.g., a smartwatch. The wearable device may connect to HMD device 120 to provide indirect interactions. In one embodiment, controller 130 may be a smartphone, which could be strapped to the user's arm as a special wearable device to indirectly interact with the object. The wearable device can be configured to detect the position or orientation of itself or its host (e.g., a wrist or an arm). For instance, the wearable device could employ built-in sensors (e.g., accelerometer, gyroscope, magnetometer, or GPS sensors). In another instance, the wearable device could emit signals (e.g., light or IR) that can be detected by HMD device 120 to determine the position and/or orientation of the wearable device relative to HMD device 120.

When controller 130 is a wearable device, the user may use body movement (e.g., the arm movement) to cause the wearable device to move in a certain pattern, cause the wearable device to change position (e.g., facing up or facing down), or cause the wearable device to change its location (e.g., the 3D coordinates) in the CMR environment. Subsequently, the wearable device may send signals to HMD device 120 to indicate the movement, the position, or the location of the wearable device. Such signals may be used to indirectly interact with objects (e.g., virtual objects).

In some embodiments, controller 130 may be employed to activate a target menu item, e.g., by pushing a button (not shown) on controller 130. Subsequently, user 110 may use controller 130 to control the variation and magnitude of the operation, as a way of facilitating the indirect interaction. As an example, user 110 may use controller 130 to browse through a series of color options if the indirect interaction of "change colors" is activated. Feature 142 may change colors dynamically according to, for instance, the present position of controller 130. In another example, when an indirect interaction of "slide" is activated and the direct interaction via hand 112 already indicates a directional movement (e.g., moving right), the operation of controller 130 may generate a signal of distance to be moved. Optionally, such distance information may be presented along with feature 142 in the CMR environment, such as overlaying the distance information to menu 150. As such, the syndicate of the direct interaction of moving feature 142 in the right direction, combined with the indirect interaction of a distance to be moved, can enable HMD device 120 to render a different view, in which feature 142 moves directionally right with the specified distance.

In some embodiments, indirect interaction is visualized as virtual direct interaction to user 110. For example, when using a dial to rotate an object around a vertical axis, a virtual hand may be rendered rotating the object, corresponding to the actual hand rotating the dial. When the user's hand touches the dial, user 110 sees a virtual hand moving toward the object of choice, and then rotates the objects corresponding to the motion of the controller. The result is an indirect interaction that is visualized as direct manipulation.

In various embodiments, controller 130 may be connected to HMD device 120 using wired technologies (e.g., coaxial cable, twisted pair, optical fiber, etc.) or wireless technologies, including a short-range wireless telecommunications connection, e.g., a Wi-Fi® connection, a Bluetooth connection, or the like.

In some embodiments, a syndicate of the gaze of user 110 and an indirect interaction based on controller 130 is used to modify the CMR environment. In other words, the gaze of user 110 is also referred to as a form of direct interaction in this disclosure. By way of example, the gaze of the user 110 may be used to select an object to interact with, while controller 130 is employed by the user 110 to indirectly interact with the object. In this example, the controller 130 can be utilized to rotate the object that the user is gazing at. In another example, the trajectory of the eye gaze may be interpreted as a direction for moving the object, while indirect interactions based on inputs received by the controller 130 may be used to determine the precise movement of the object, e.g., the distance.

In some embodiments, controller 130 may provide haptic feedback to user 110. In one example, controller 130 may provide an act of vibrating in response to hand 112 touching feature 142. Further, controller 130 may provide different types of vibrations depending on the interaction point of the direct interaction. For instance, if the interaction point is a corner of feature 142, controller 130 will vibrate only once. However, if the interaction point is a surface of feature 142, controller 130 will vibrate multiple times. In another example, assuming user 110 uses controller 130 to control the rotation of feature 142, haptic feedback may be provided to guide user 110 without the need for user 110 to look at controller 130. For instance, controller 130 could tick for every predefined angle of rotation (e.g., every 30 degrees).

In various embodiments, controller 130 can be used by the dominant hand or the non-dominant hand of user 110. In this way, user 110 may choose to use the dominant hand to directly interact with objects in the CMR environment while using the non-dominant hand to provide indirect interactions with those objects, e.g., via controller 130. Similarly, user 110 may switch dominant and non-dominant hands to facilitate the direct and indirect interactions.

Figure 2:
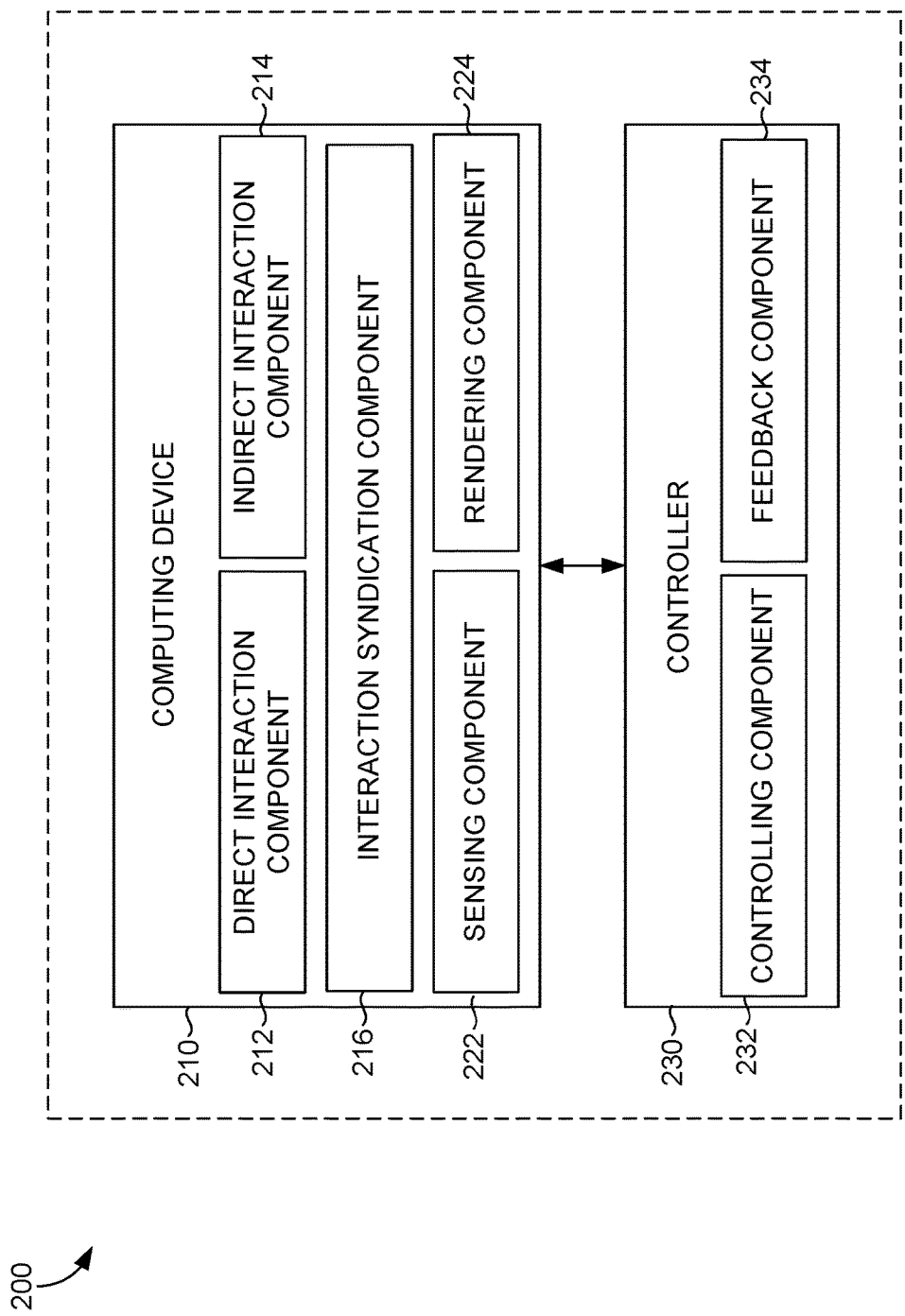
FIG. 2 is a block diagram of an exemplary computing system for syndicating direct and indirect interactions, in accordance with some embodiments of the present disclosure.

With reference to FIG. 2, interaction syndication system 200 for syndicating direct and indirect interactions is provided, in accordance with some embodiments of the present disclosure. Interaction syndication system 200 includes computing device 210 and controller 230. In various embodiments, computing device 210 can include a head-mounted display (HMD) device, like HMD device 120 illustrated in FIG. 1. Controller 230 could be configured in a variety of form factors, such as controller 130 illustrated in FIG. 1.

In some embodiments, computing device 210 may include any type of computing device, such as computing device 900 described below with reference to FIG. 9. As will be described in more detail below, in various embodiments, computing device 210 can include, among other things, direct interaction component 212, indirect interaction component 214, interaction syndication component 216, sensing component 222, and rendering component 224. In further embodiments, controller 230 can include controlling component 232 and feedback component 234. In accordance with embodiments described herein, it is contemplated that the aforementioned components can be implemented in any one or more components or subcomponents of computing device 210. For instance, any one of direct interaction component 212, indirect interaction component 214, and interaction syndication component 216 may be implemented at least in part within a processor, graphical processing unit (GPU), application code, firmware, and the like.

Further, a "component" as used herein refers to any device, process, service, or any combination thereof. A component may be implemented using hardware, software, firmware, a special-purpose device, or any combination thereof. A component may be integrated into a single device or it may be distributed over multiple devices. The various aspects of a component may be collocated or distributed. The component may be formed from other components and aspects thereof.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Computing device 210 may include any type of HMD or augmented reality device described below with reference to FIGS. 7 and 8. The augmented reality device is an exemplary HMD device, and other types of augmented reality devices (e.g., projectors) are contemplated in accordance with embodiments of the present disclosure. Computing device 210 may be a scene-aware device that understands elements surrounding a real-world environment and generates virtual objects as augmented reality images. One non-limiting example of computing device 210 is the HoloLens®, developed by Microsoft Corporation of Redmond, Wash.

Computing device 210 can be configured to capture the real-world environment based on components of computing device 210, e.g., sensing component 222. Sensing component 222 may include a depth camera and/or sensors that support understanding elements of a scene or environment, for example, generating a 3-D mesh representation of a surrounding real-world environment. Further, sensing component 222 can use the depth camera and/or sensors to detect direct interactions, e.g., between a physical hand and a virtual object in the CMR environment. Rendering component 224 may render virtual objects or images based at least in part on the 3-D mesh representation. In this regard, computing device 210 can specifically include functionality (e.g., augmented reality or mixed reality experiences realized through rendering component 224) to modify the CMR environment (e.g., to create or modify a virtual object) based on a syndicate of direct and indirect interactions.

Direct interaction component 212 processes and analyzes information of detected direct interactions with objects in a CMR environment. By way of example, sensing component 222 may detect a direct interaction with a virtual object. Subsequently, sensing component 222 may send various signals related to the direct interaction to direct interaction component 212. Accordingly, direct interaction component 212 can receive input signals that are generated based on a detected direct interaction (e.g., natural or hypernatural) directed to a computer-generated object in a CMR environment. Further, direct interaction component 212 can determine a characteristic of the detected direct interaction, e.g., based on the received signals.

In accordance with embodiments described herein, sensing component 222 can include various sensor component(s), e.g., gyroscope, accelerometer, and magnetometer, infrared lights, infrared cameras, motion sensors, light sensors, 3-D scanners, CMOS sensors, GPS radio, etc. In various embodiments, sensing component 222 can employ the aforementioned sensors, among other things, to identify an intended target (e.g., a virtual object) from the CMR environment, and in some instances, track physical locations and movements (e.g., eye tracking, body movement, finger positions, etc.) of a user, e.g., who wears or otherwise links to computing device 210.

Accordingly, from the received signals, direct interaction component 212 may determine various characteristics associated with the detected direct interaction, such as the gaze position of the user; the locations of various body parts (e.g., hands or fingers) before, during, and after the detected direct interaction; the characteristics of the body movement (e.g., the velocity, the acceleration, the direction, the frequency of the body movement); the interaction point of the virtual object related to the detected direct interaction; or any other characteristics associated with the detected direct interaction.

In some embodiments, direct interaction component 212 can determine the characteristics of the direct interaction based at least in part on the relative proximity between a moving object (e.g., a hand, a finger) and a virtual object in the CMR environment. In one embodiment, sensing component 222 can detect the target object in the CMR environment based on a detected gaze of the user. In further embodiments, sensing component 222 can detect locations of a hand or a finger in the CMR environment. In even further embodiments, sensing component 222 can detect the distance between the hand or finger and the target object. As an example, if the distance between the finger and the target object becomes less than a predetermined threshold, direct interaction component 212 may identify the interaction as a direct interaction between the finger and the target object.

In some embodiments, direct interaction component 212 can recognize a gesture performed by the user. For instance, the user can perform gestures using their extremities (e.g., arms, fingers, legs, head, etc.), which can be detected, by way of example, via an optical input component such as a camera, motion sensor, infrared sensor, and the like. In this regard, more intricate details associated with the user's hand can be analyzed to facilitate the identification of the direct interaction. Specifically, an orientation of the hand, finger positioning and joint angles, gestures (e.g., pointing), or other hand characteristics that are detectable based on an analysis of the received input data can enable direct interaction component 212 to characterize the direct interaction. Accordingly, direct interaction component 212 may interpret such gestures as direct interactions with the CMR environment, e.g., with the virtual object presently gazed at by the user. In various embodiments, such gestures can be mapped to a predefined type of direct interaction, e.g., based on a predefined configuration, a configuration set by the user, or a default configuration.

Controller 230 can include controlling component 232 and feedback component 234, among other components not directly shown in FIG. 2. Similar to controller 130 in FIG. 1, controller 230 may be embodied in various form factors, such as a dial, a slate, a joystick, a touchpad, a mouse, a keyboard, a VR controller, a pen-like controller, and the like. In various embodiments, controller 230 can generate signals for indirect interaction based on user inputs received thereby. In various embodiments, user inputs can be received via at least one button, touchscreen surface, motion sensor (e.g., accelerometer, gyroscope), control interface, or any combination thereof. That is, controller 230 can be utilized to generate control signals to indirectly interact with intended targets in the CMR environment.

Controlling component 232 can receive various forms of user input, e.g., via sensors or control interfaces associated with controlling component 232. Depending on the form factor of controller 230, the received user inputs may be encoded into various analog or digital signals to represent various characteristics (e.g., the duration and the magnitude) of one or more identifiable user inputs. In other words, such signals include measurement information of the user inputs.

Upon receiving such signals from controller 230, indirect interaction component 214 can process and analyze such signals. By way of example, indirect interaction component 214 may determine whether such signals relate to a detected direct interaction, e.g., by looking up any events of detected direct interactions within a predefined duration or time window. In some embodiments, direct interaction component 212 can determine an interaction point of the virtual object related to the detected direct interaction, and indirect interaction component 214 can further determine a modification setting, such as a magnification setting related to the interaction point or a rotation setting of the virtual object associated with and/or relative to the interaction point.

In various embodiments, indirect interaction component 214 may interpret the signals based on the characteristics of the direct interaction. For example, if the direct interaction is a linear movement action, the signals of indirect interaction may include the distance of such linear movement. If the direct interaction is a rotation action, the signals of indirect interaction may include the degree of such rotation. If the direct interaction is a magnification action, the signals of indirect interaction may include the scale factor of such magnification.

In connection with FIG. 1, controller 230 may also be used to select a particular form of indirect interaction, e.g., based on menu 150 in FIG. 1. Advantageously, when there are many options of indirect interaction related to a detected direct interaction, controller 230 can be used to disambiguate the user intention, e.g., by selecting what the user wants from the menu.

Interaction syndication component 216 can process information from direct interaction component 212 and indirect interaction component 214, and can further determine how the CMR environment should be modified. Interaction syndication component 216 may determine a form of the modification based on the direct interaction, and a control parameter for controlling the modification based on the indirect interaction. It may also be said that interaction syndication component 216 can determine the reaction of the virtual object in view of the direct and indirect interactions related to the virtual object.

Continuing with the examples previously discussed in connection with indirect interaction component 214, if the direct interaction is a linear movement action (i.e., the form of the modification) and the indirect interaction further controls the distance of such linear movement (i.e., the control parameter of the form), then the syndicate of these direct and indirect interactions can cause the virtual object to move linearly for the distance corresponding to the indirect interaction. By the same token, if the direct interaction is a rotation action (i.e., the form of the modification) and the indirect interaction further controls the degree of such rotation (i.e., the control parameter of the form), then the syndicate of these direct and indirect interactions can cause the virtual object to rotate a number of degrees corresponding to the indirect interaction. If the direct interaction is a scale action (e.g., shrink or enlargement) and the indirect interaction further controls the scale factor of such magnification, then the syndicate of these direct and indirect interactions may cause the virtual object to scale (i.e., the form of the modification) based on the scale factor (i.e., the control parameter of the form) corresponding to the indirect interaction.

In various embodiments, rendering component 224 may cause options of direct or indirect interaction to be presented in the CMR environment, such that a user may be presented with a guide listing the available interaction options associated with the target object. Further, rendering component 224 can modify how virtualized objects are rendered and ultimately perceived by the user, e.g., based at least in part on the syndicate of these direct and indirect interactions. In other words, rendering component 224 may modify the virtual object, e.g., by modifying the configuration (e.g., the position, size, shape, angle) of the virtual object, transforming (e.g., scale, rotate, skew, stretch, warp) the virtual object, or deleting the virtual object, or even creating new ones, in accordance with the syndicate of these direct and indirect interactions.

In various embodiments, each virtual object rendered by rendering component 224 is positioned at a corresponding location relative to an HMD, and thereby also to the user wearing the HMD. Moreover, the rendered virtual object can be continuously modified in real time, by rendering component 224, to maintain the proper perspective and configuration of rendered virtual objects, e.g., in accordance with the syndicate of these direct and indirect interactions.

In various embodiments, each of direct interaction component 212, indirect interaction component 214, and interaction syndication component 216 can generate an indication for feedback based at least in part on the determined characteristic of the detected direct interaction, indirect interaction, or the syndicate of the direct and indirect interactions. The indication for feedback may be transmitted to controller 230. In some embodiments, feedback component 234 may provide feedback to the user. The feedback may be provided in a particular form or in a combination of forms, such as haptic feedback, thermal feedback, or audible feedback. The feedback may be provided via computing device 210, controller 230, or another device connected to them. In this way, the user may receive confirmation of the detected direct interaction, indirect interaction, or the syndicate of the direct and indirect interactions, and modify those interactions if necessary, all without interruptions (e.g., looking down to the controller 230) to continue interactions with the CMR environment.

The specific forms of feedback may be determined based on the detected characteristics of the interaction and the implementation of feedback component 234. In one example, controller 230 may provide an act of vibration in response to a detected direct interaction if a vibration component (e.g., a haptic motor) is installed in feedback component 234. In another example, controller 230 may provide an audible sound for a detected indirect interaction, for instance, a speaker that beeps for every 10 degrees of detected rotation by controller 230.

In some embodiments, feedback component 234 may provide feedback of limits of interaction. For example, for a scaling operation of a virtual object, if the scaling operation cannot be rendered further, such as due to limited free space in the scene, feedback component 234 may provide feedback of such limitations, e.g., in the form of playing an audible signal, in the form of a haptic feedback (e.g., a click) in controller 230, in the form of stopping the operation of controlling component 232, etc.

Figure 3:
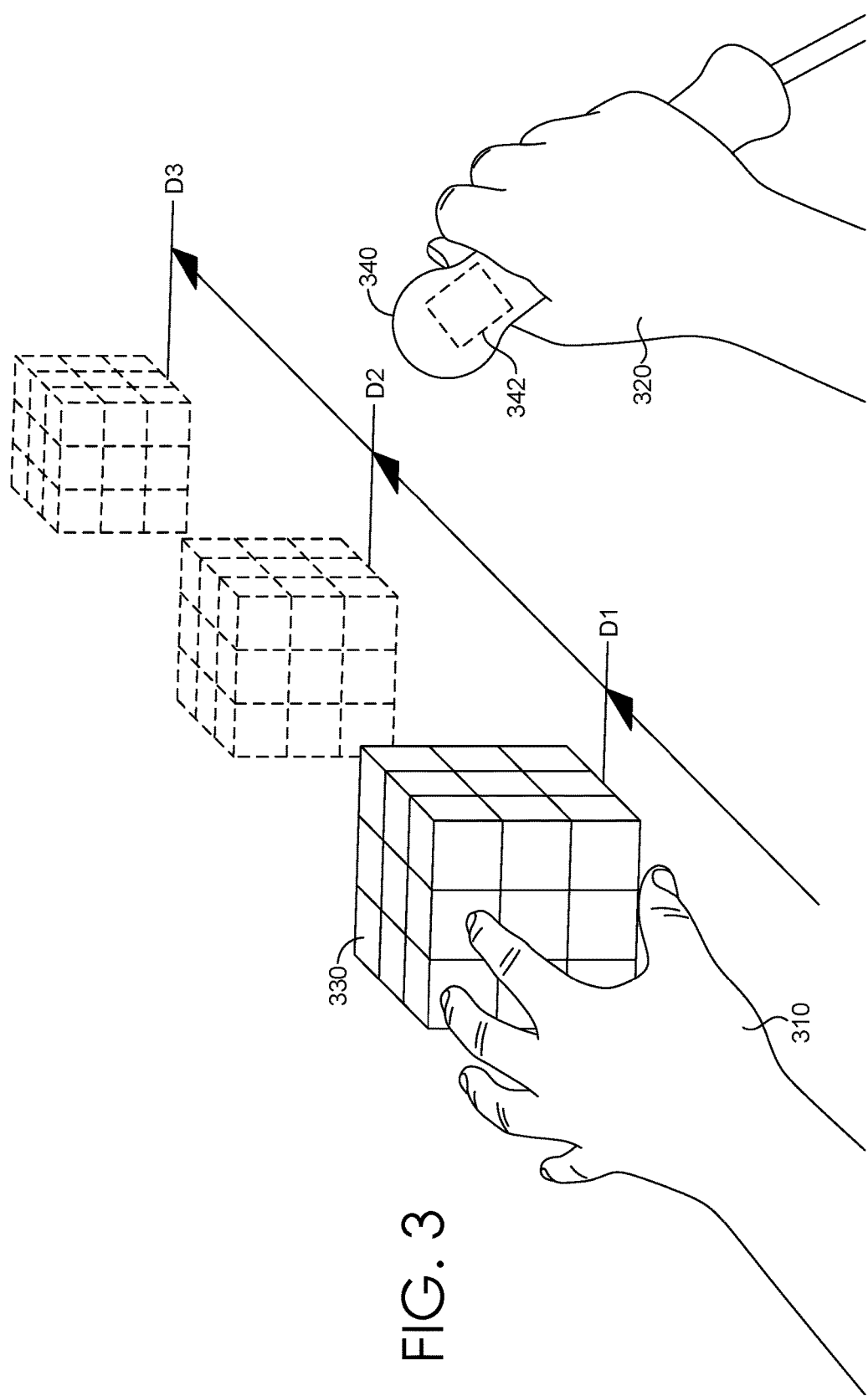
FIG. 3 is a schematic showing an exemplary implementation of a syndicate of direct and indirect interactions, in accordance with some embodiments of the present disclosure.
Figure 4:
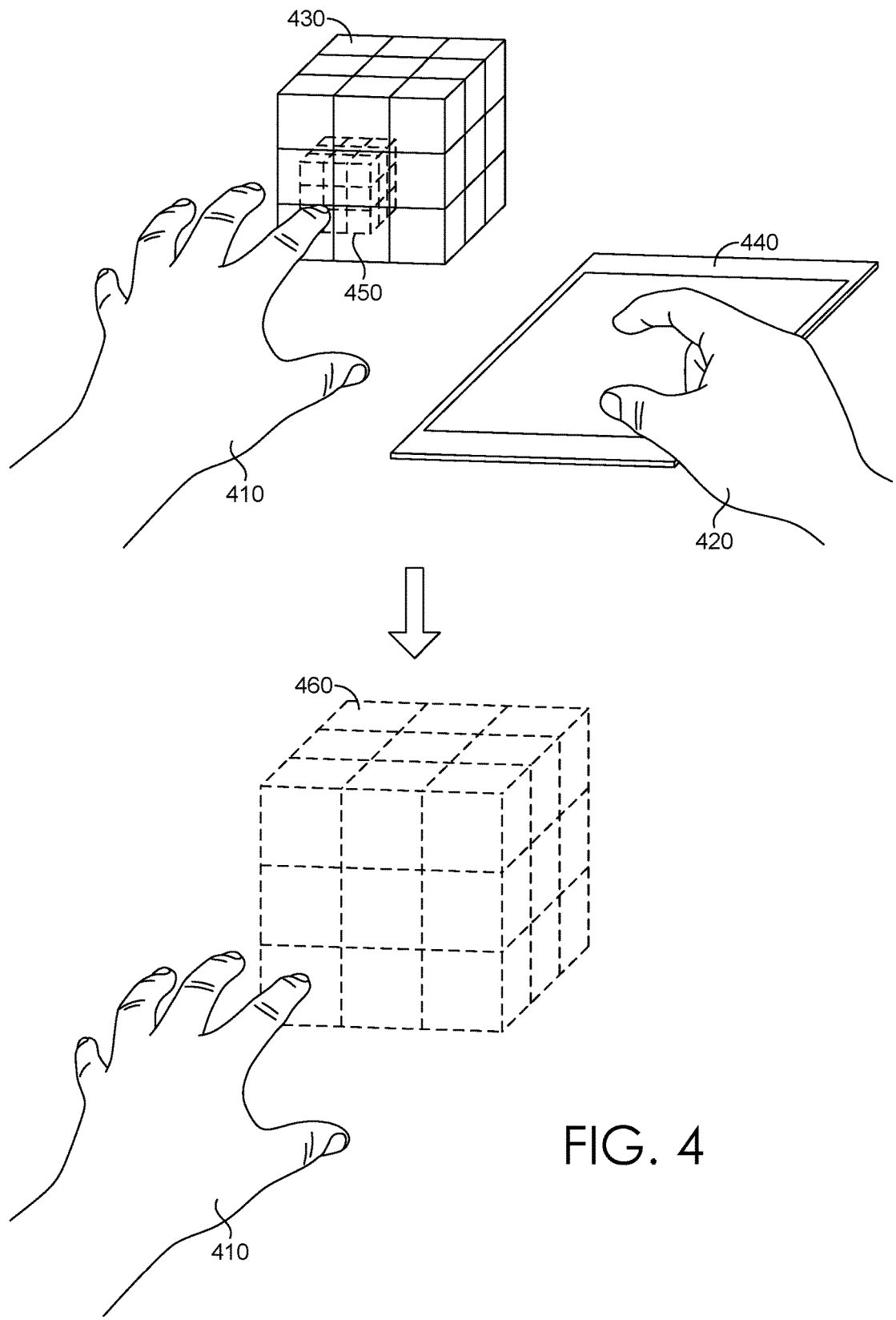
FIG. 4 is a schematic showing an exemplary implementation of another syndicate of direct and indirect interactions, in accordance with some embodiments of the present disclosure.

With reference to FIG. 3 and FIG. 4, embodiments of the syndication of direct and indirect interactions can be explained in more detail, using exemplary implementations. For purposes of illustrating particular features of the present disclosure, the syndication of direct and indirect interactions with virtual object 330 is illustrated in FIG. 3.

In various implementations, virtual object 330 may include one or more control points that facilitate a natural or hypernatural interaction therewith. In this way, a user can directly interact with a virtual object control point to interact with the virtual object. In some further implementations, a selected control point of the intended target can be directly interacted with to facilitate directed interactions or modifications to the intended target based on the selected control point.

Left hand 310, in this example, directly contacts virtual object 330. In this case, the surface area of virtual object 330 is an identifiable virtual object control point. Optionally, a menu (not shown) of indirect interactions may be presented to the user. For example, the menu options may include pull or push. The user may select the desired menu item, e.g., push, via controller 340. Controller 340 may have a menu selection button (not shown) for the user to activate the menu item. Alternatively, the menu item may be selected based on the user's eye gaze, e.g., a gaze position indicator (e.g., crosshairs) can be presented in the CMR environment to guide the user in making the selection. In some embodiments, there is a default action for indirect interactions. Without any selection, the user may operate controller 340 to indirectly interact with virtual object 330.

In this implementation, the user operates controller 340 using right hand 320. The operation may include pushing, pulling, or rotating controller 340. When the user pushes controller 340, controller 340 can employ sensors to indicate how far and how long controller 340 has been pushed. In this regard, the controller 340 can generate signals including the sensed distance. Such signals may then be utilized to define the characteristics of this indirect interaction. By way of example, virtual object 330 is located at the D1 position during the direct interaction. When the user pushes controller 340, the signals generated by controller 340 can be used to define the distance that virtual object 330 would be pushed. In one embodiment, the syndicate of these direct and indirect interactions may cause virtual object 330 to be pushed to the D2 or D3 position depending on the magnitude represented by the signal, which may correspond to the sensed duration of the push or the sensed physical force applied on controller 340, and/or a displacement of controller 340. In another embodiment, while controller 340 is being pushed, the movement of virtual object 330 may be simulated in the CMR environment. For example, the view may be modified to show the real-time movement of virtual object 330 during the user operation of controller 340.

In one embodiment, controller 340 may have haptic rendering capability, for example, a rotating disc that displays the surface normal at the point of the finger and virtual object 330. It may also render the local shape of the surface, and by doing so, guide hand 320 to operate controller 340 without the need for the user to look at controller 340.

In various embodiments, feedback component 342 can provide a variety of feedback to the user, in response to the direct interaction, the indirect interaction, or the syndicate of the direct and indirect interactions. As an example, feedback component 342 may provide one kind of haptic feedback (e.g., a vibration pattern for a brief duration) when the direct interaction is detected. As another example, feedback component 342 may provide another kind of haptic feedback (e.g., a vibration pattern for an extended duration) during the indirect interaction. As yet another example, feedback component 342 may provide another kind of haptic feedback (e.g., a vibration pattern having high frequency or amplitude) when the syndicate of the direct and indirect interactions are applied to virtual object 330 (e.g., when virtual object 330 finally moved to the desired location).

With reference now to FIG. 4, the graphical illustration depicts the direct interaction between left hand 410 and virtual object 450 inside another virtual object 430. Meanwhile, right hand 420 may operate controller 440 (e.g., a touchpad receiver) to indirectly interact with virtual object 450. As a result, virtual object 450 is enlarged in this example, to become virtual object 460 based on the syndicate of these direct and indirect interactions.

To initiate the direct interaction with virtual object 450, left hand 410 may use a finger to pierce through virtual object 430 and virtually "touch" virtual object 450. In one embodiment, the CMR environment may be modified, e.g., the color of virtual object 450 may be changed, to indicate the detected direct interaction. In another embodiment, controller 440 may provide audible feedback, such as an audible beep, and/or haptic feedback or the like, to indicate the detected direct interaction.

Right hand 420 may use a gesture, e.g., a reverse pinch, to indirectly interact with virtual object 450. The reverse pinch may be measured and translated into a scale factor. As a result, virtual object 450 may be transformed into virtual object 460 based on the syndicate of the direct interaction with virtual object 450 and the indirect interaction indicating the scale factor.

In some embodiments, the indirect interaction via right hand 420 with controller 440 is visualized as a virtual direct interaction. For example, suppose that the operation is sculpting in clay. Left hand 410 may guide the interaction to a specific location, and then fingers of right hand 420 can move on or gesture the touch surface of controller 440 to sculpt. The touch surface of controller 440 is 2D while object 450 is 3D. In this case, right hand 420 can define the corresponding plane of surface on object 450, for example, using the palm of right hand 420 as a reference plane to define the corresponding plane of surface on object 450. Further, a virtual tool (e.g., a graver) may be rendered to interact with virtual object 450, so that the user can have a visual feedback of the sculpting operation in relationship with the indirect interaction with controller 440.

Figure 5:
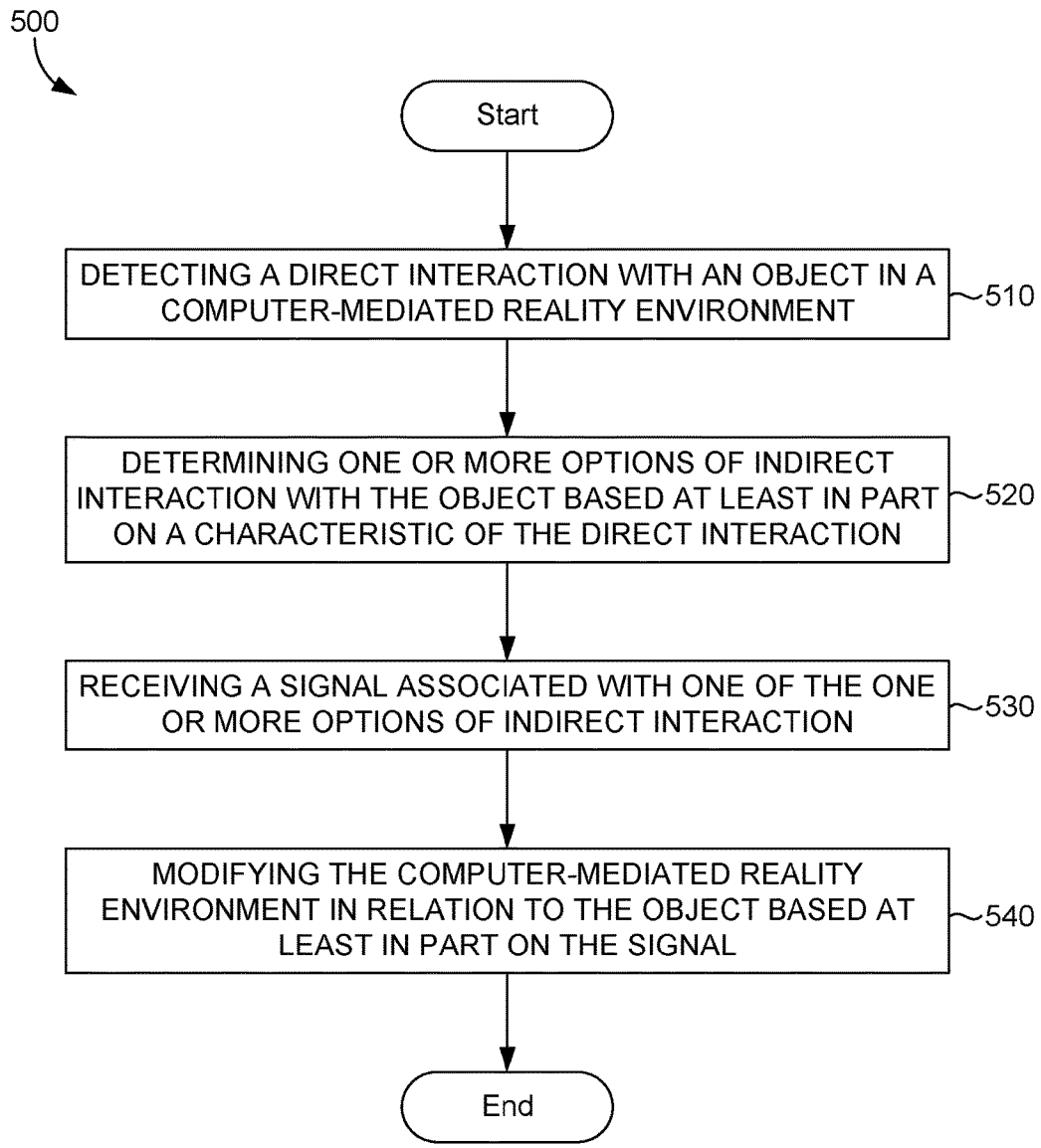
FIG. 5 is a flow diagram showing a process for syndicating direct and indirect interactions, in accordance with some embodiments of the present disclosure.

Referring now to FIG. 5 in light of FIGS. 1-4, FIG. 5 is a flow diagram showing a method 500 for syndicating direct and indirect interactions. Each block of method 500, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

At block 510, a direct interaction with an object in a CMR environment can be detected, for instance, by direct interaction component 212 of FIG. 2. The CMR environment may include virtual objects rendered in a computer-generated world (e.g., VR), or may include virtual objects rendered for augmentation or mixing with the real world (e.g., AR/MR). In various embodiments, the relative proximity (i.e., a distance) between an actor (e.g., a finger or a handheld instrument) and a virtual object may be measured, e.g., by the sensing component 222 of FIG. 2. If such distance is below a predetermined threshold of distance for a period longer than a predetermined threshold of time, direct interaction component 212 may recognize a direct interaction between the detected body part and the virtual object.

As described herein, the relative proximity can be determined based on rendering information associated with the virtual object and sensing information (e.g., via a camera or other optical sensor) associated with the actor. The rendering information can be extracted from, among other things, a transformation matrix or a projection matrix associated with the virtual object. In some instances, the relative proximity can be based further on an approximated or calculated distance between an extension of the user (e.g., the user's hand, foot, or a handheld object) and the virtual object. In various embodiments, the relative proximity is obtained after putting the location of the virtual object and the location of the actor into a same 3-D coordinate system, such that the Euclidean distance between the two locations may be calculated.

In some embodiments, the information of relative proximity, such as the distance from the hand to the virtual object, is used to control the scale of the operation. For example, imagine controlling a ragdoll puppet, the rotation operation may be applied to the entire doll when the hand is far from the doll. However, the rotation operation may be applied to the doll head only when the hand is getting closer to the doll. Similarly, the rotation operation may be applied to an eye of the doll, e.g., to rotate the doll gaze, when the hand is very close to the eye.

At block 520, one or more options of indirect interaction with the object may be determined based at least in part on a characteristic of the direct interaction, for instance, by indirect interaction component 214 of FIG. 2. The characteristics of the direct interaction may include a property of the virtual object, a property of the controller, the manner of the interaction, contextual information related to the direct interaction, etc. The properties of the virtual object may include the nature of the object (e.g., a virtual animal, a virtual toy, or a virtual piece of furniture), the size, the weight, the orientation, and many other properties of the virtual object. The manner of the interaction may include the point of interaction (e.g., a point or a surface), the action associated with the interaction (e.g., grabbing, pushing, pulling, rotating, piecing), the direction of the interaction (e.g., the direction related to the force), the number of fingers used to interact, etc. Contextual information related to the direct interaction may include the view, the perspective, the previous action of the user, the gaze of the user, the objects surrounding or near the target object, etc.

Based on the characteristic of the direct interaction, one or more options of indirect interactions related to the target object may be determined. As an example, if a finger touches a particular point at a virtual Earth 3D object in a direct interaction, the options of indirect interaction may include moving the virtual object linearly, rotating the virtual object along a latitude crossing the interaction point, rotating the virtual object along a longitude crossing the interaction point, magnifying the interaction point and showing more details, etc.

At block 530, a signal associated with one of the one or more options of indirect interaction may be received, e.g., by indirect interaction component 214 of FIG. 2. Such signal may be generated from a controller, e.g., a mouse, a joystick, a dial, or a VR controller, just to name a few. In some embodiments, the signal includes information of a selection of a particular option for indirect interaction. Further, the signal may also include information of various properties or measurements of the indirect interaction, e.g., the duration or the magnitude of the indirect interaction.

In some embodiments, indirect interaction techniques disclosed herein can enable real world objects to be used as general controllers. For example, a user is to operate multiple virtual soccer player characters in an animation, and each virtual soccer player is associated with a distinguishable physical object on a table. Further, rotating a physical object may change the animation associated with each player. In this case, the physical objects can be used as general controllers. By way of example, the user may rotate each physical object like a knob to change animation of the corresponding virtual soccer player.

At block 540, the CMR environment in relation to the object may be modified based at least in part on the signal. In various embodiments, the signal related to the indirect interaction is interpreted in view of the direct interaction. The syndicate of the direct and indirect interactions is used to modify the CMR environment. In some embodiments, the target object is a virtual object, which may be re-rendered or transformed based on the syndicate of direct and indirect interactions, as illustrated in FIG. 3 or FIG. 4.

In some embodiments, the target object is a physical object, e.g., a table. The direct interaction may be a preconfigured gesture, e.g., tapping the table twice. The indirect interaction, in this case, can use a joystick to select a gift from a list of gifts. The syndicate of these direct and indirect interactions in this case may cause the selected gift to be presented on the table as a new virtual object in the CMR environment. In other words, the table is augmented with the virtual gift.

In some embodiments, indirect interaction with a controller affects multiple selected objects. In an implementation of persisting selection, a user may sequentially tap multiple objects with direct interactions to select them. The objects could either stay selected, or stay selected for a certain period of time. The indirect interaction with a controller would then affect the selected multiple objects. This embodiment allows one handed interaction where the same hand can select the objects, and then reach out for the controller to control them.

Figure 6:
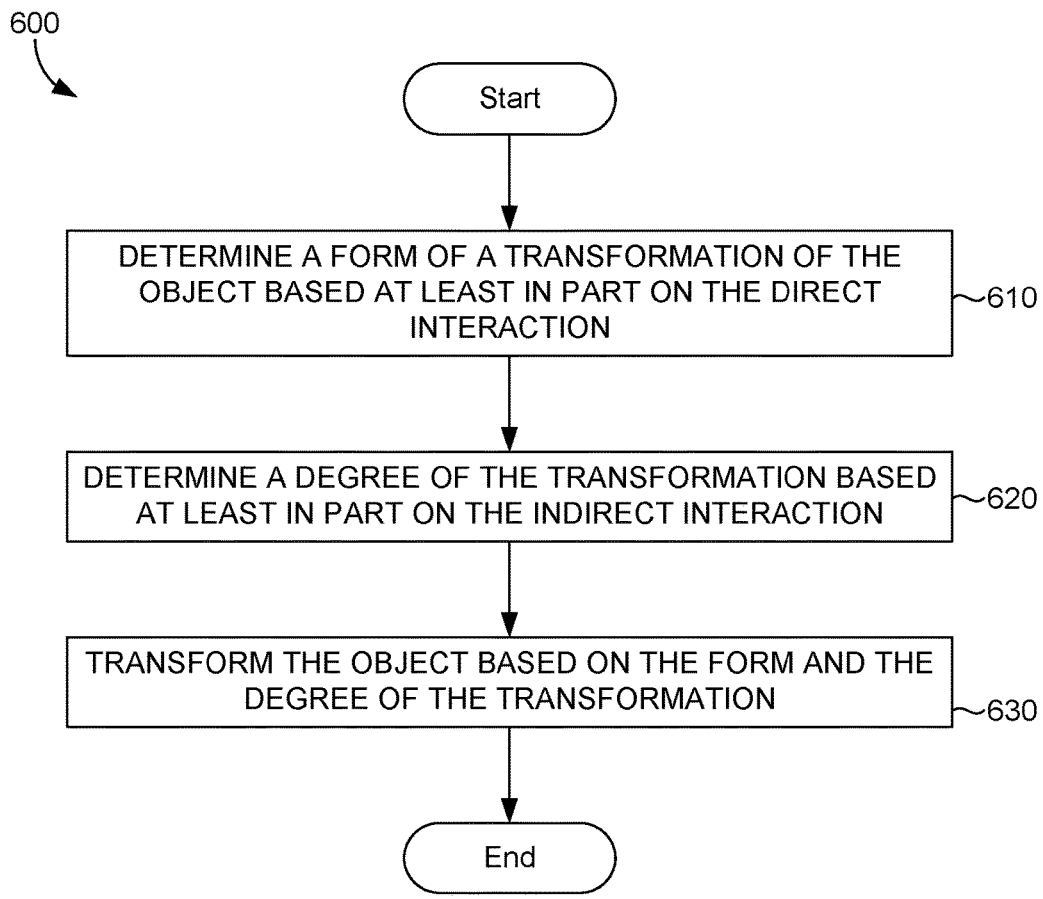
FIG. 6 is a flow diagram showing a process for transforming an object based on direct and indirect interactions, in accordance with some embodiments of the present disclosure.

Referring now to FIG. 6 in light of FIGS. 1-5, FIG. 6 is a flow diagram showing a method 600 for transforming an object based on direct and indirect interactions. Each block of method 600, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few. In various embodiments, method 600 may be performed in relation to block 540 of FIG. 5.

At block 610, a form of a transformation of the object may be determined based at least in part on the direct interaction. The form of the transformation refers to the operation to be applied to the object, e.g., a selection, a linear movement, an angular movement, a scaling operation, a deformation operation, or other types of operations relevant to the object. A host of relevant operations may be identified from characteristics associated with the direct interaction. A default operation may be configured for the direct interaction based on, e.g., the context, the object selected, and so on.

At block 620, a degree of the transformation may be determined based at least in part on the indirect interaction. The degree of the transformation refers to one or more controlling parameters of the operation. For example, if the form of the transformation is a linear movement, the degree of the transformation may be a distance of the linear movement. If the form of the transformation is a rotation operation, the degree of the transformation may be an angle of the rotation. If the form of the transformation is a magnification operation, the degree of the transformation may be a ratio of the magnification. If the form of the transformation is a deformation, the degree of the transformation may be a degree of the deformation. If the form of the transformation is to animate an object over time, the degree of the transformation may be a duration or speed of the animation.

At block 630, the object may be transformed based on the form and the degree of the transformation. In various embodiments, modifying the CMR environment comprises transforming the object based at least in part on the form and the degree of the operation. By way of example, the operation is to grow a bar on a bar graph. In this case, the direct interaction indicates which bar to grow, while the indirect interaction indicates how much the bar should grow. As a result, the target bar may be transformed to a different bar (e.g., with a different height) based on the identified form and degree of this transformation.

Figure 7:
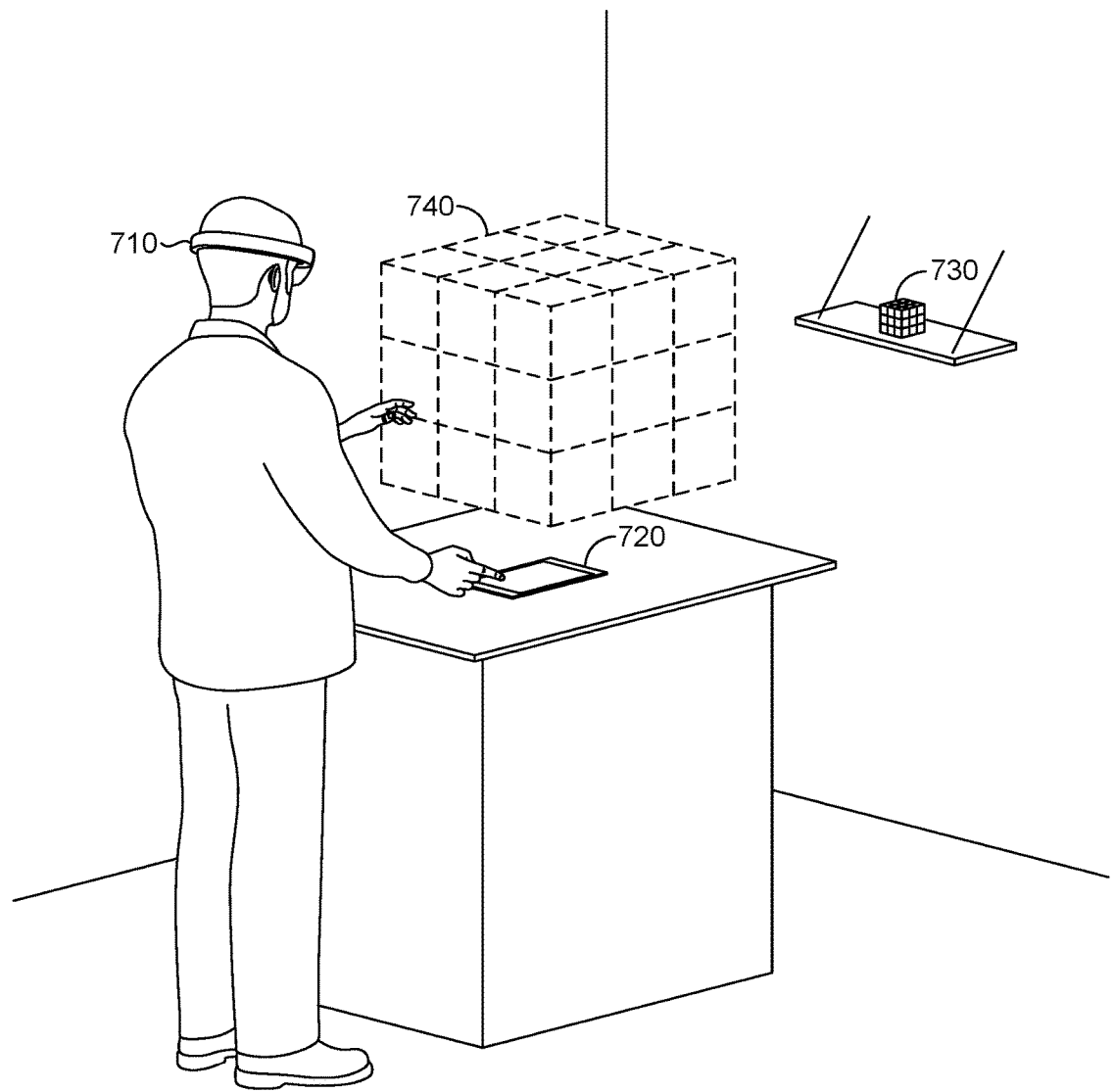
FIG. 7 is a schematic diagram showing exemplary augmented reality images of a head-mounted display unit, in accordance with some embodiments of the present disclosure.

With reference to FIG. 7, exemplary images of a head-mounted display (HMD) device 710 are depicted. Rendered virtual objects provided by the HMD device generally appear in rendered space in virtual reality configurations. However, in augmented reality configurations, virtual objects (e.g., 730 and 740) may appear superimposed on a real-world background and may appear to interact with or be integral with the background. In augmented reality configurations, the background is comprised of a real-world scene, e.g., a scene that a user would perceive without augmented reality images emitted by the HMD device. For example, cube 730 can appear atop the shelf, while cube 740 can appear atop the countertop. In various embodiments, left hand 750 may directly interact with cube 740, e.g., to touch an edge of cube 740 to cause it to rotate, and right hand 760 may provide indirect interactions with cube 740, e.g., to provide the direction and the angle of rotation.

Figure 8:
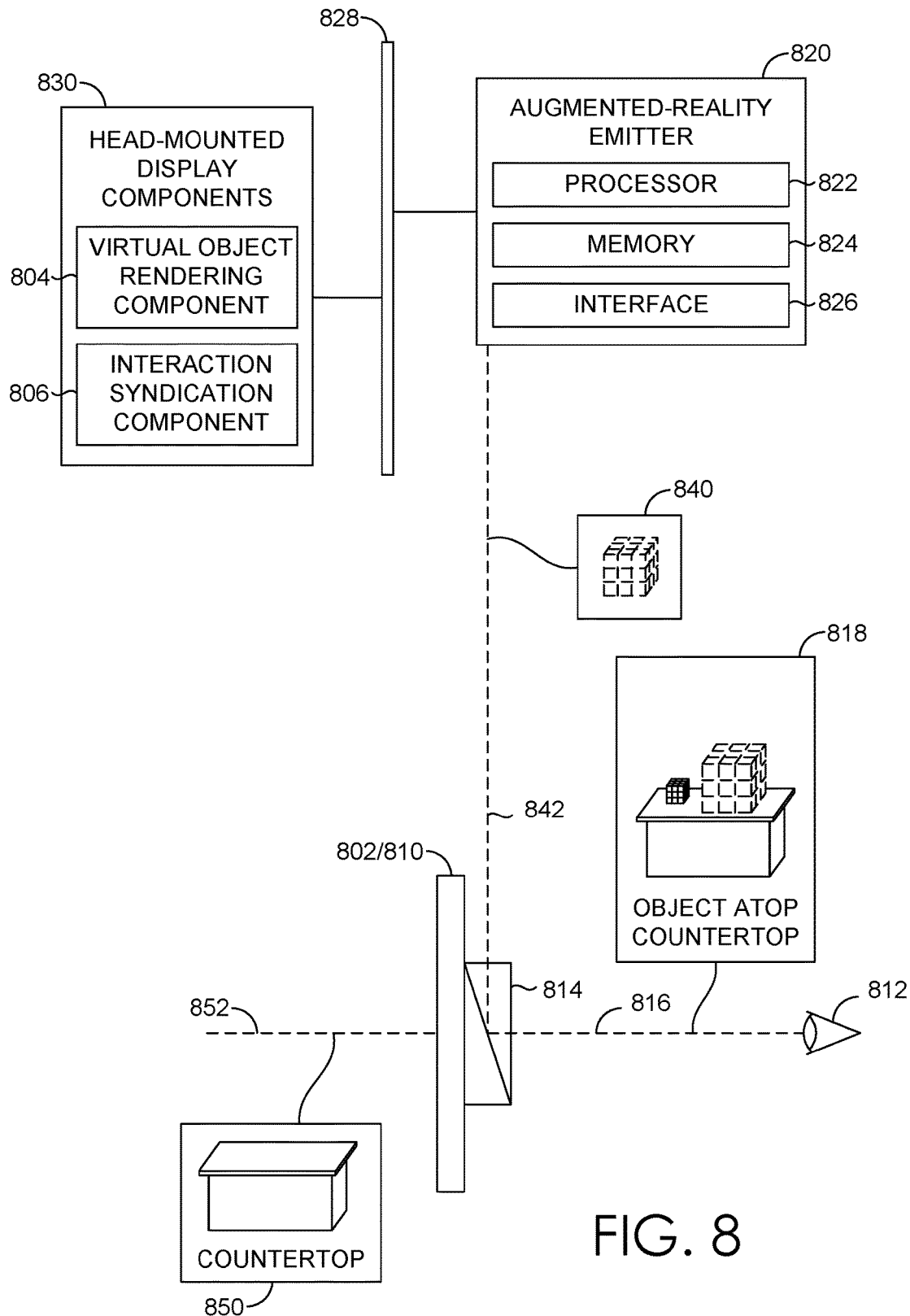
FIG. 8 is a block diagram of an exemplary head-mounted display unit, in accordance with some embodiments of the present disclosure.

Turning to FIG. 8, a mixed reality HMD device 802 for augmented reality applications having, among other things, a virtual object rendering component 804 and an interaction syndication component 806 is described in accordance with an embodiment described herein. The HMD device 802 includes a see-through lens 810 which is placed in front of a user's eye 812, similar to an eyeglass lens. It is contemplated that a pair of see-through lenses 810 can be provided, one for each eye 812. The lens 810 includes an optical display component 814, such as a beam splitter (e.g., a half-silvered mirror). The HMD device 802 includes an augmented reality emitter 820 that facilitates altering the brightness of augmented reality images. Amongst other components not shown, the HMD device also includes a processor 822, memory 824, interface 826, a bus 828, and additional HMD components 830. The augmented reality emitter 820 emits light representing an augmented reality image 840 exemplified by a light ray 842. Light from the real-world scene 850, such as a light ray 852, reaches the lens 810. Additional optics can be used to refocus the augmented reality image 840 so that it appears to originate from several feet away from the eye 812 rather than one inch away, where the display component 814 actually is. The memory 824 can contain instructions which are executed by the processor 822 to enable the augmented reality emitter 820 to perform functions as described. One or more of the processors can be considered to be control circuits. The augmented reality emitter 820 communicates with the additional HMD components 830 using the bus 828 and other suitable communication paths. The augmented reality image 840 is reflected by the display component 814 toward a user's eye, as exemplified by a light ray 816, so that the user sees an image 818. In the image 818, a portion of the real-world scene 850, such as a countertop, is visible along with the entire augmented reality image 840, such as a cube. The user can therefore see a mixed reality image 818 in which the cube appears to be on the top of the countertop in this example.

In various embodiments, interaction syndication component 806, like interaction syndication component 216 in FIG. 2, may syndicate direct and indirect interactions with a virtual object, e.g., image 840, and cause virtual object rendering component 804 to render a modification to the virtual object or a different view of the virtual object based on the syndicate of the detected direct and indirect interactions with the virtual object.

Having described embodiments of the present invention, an exemplary operating environment in which embodiments of the present invention may be implemented is described below in order to provide a general context for various aspects of the present invention. Referring initially to FIG. 9 in particular, an exemplary operating environment for implementing embodiments of the present invention is shown and designated generally as computing device 900.

Computing device 900 is but one example of a suitable computing environment and is not intended to suggest any limitation as to the scope of use of the technology described herein. Neither should the computing device 900 be interpreted as having any dependency or requirement relating to any one or combination of components illustrated.

The technology described herein may be described in the general context of computer code or machine-usable instructions, including computer-executable instructions such as program components, being executed by a computer or other machine. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are connected through a communications network.

Figure 9:
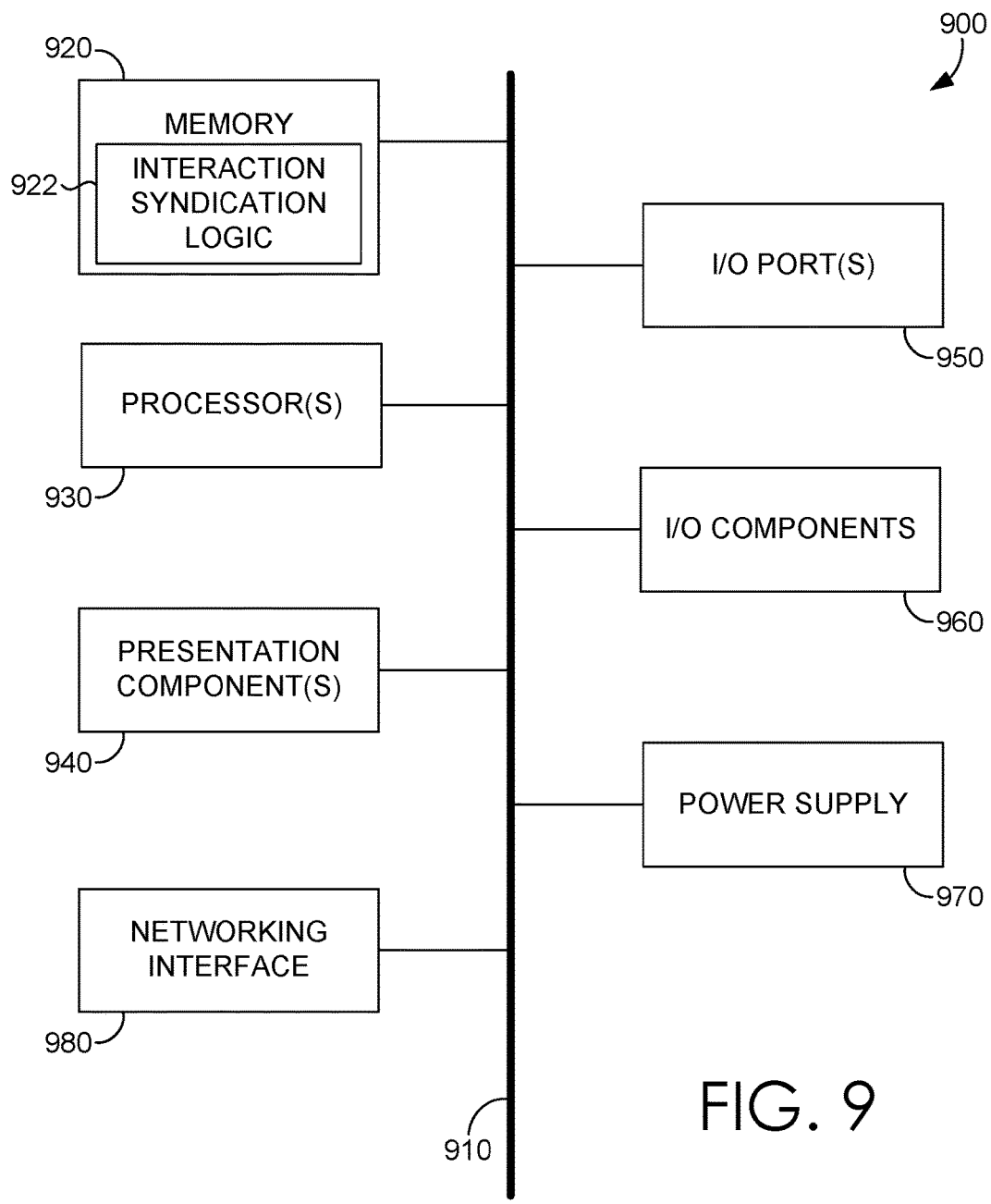
FIG. 9 is a block diagram of an exemplary computing environment suitable for use in implementing embodiments of the present disclosure.

With continued reference to FIG. 9, computing device 900 includes a bus 910 that directly or indirectly couples the following devices: memory 920, one or more processors 930, one or more presentation components 940, input/output (I/O) ports 950, I/O components 960, and an illustrative power supply 970. Bus 910 represents what may be one or more busses (such as an address bus, data bus, or a combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 9 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 9 and refer to "computer" or "computing device."

Computing device 900 typically includes a variety of computer-readable media. Computer-readable media can be any available media that can be accessed by computing device 900 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 920 includes computer storage media in the form of volatile and/or nonvolatile memory. The memory 920 may be removable, non-removable, or a combination thereof. Exemplary memory includes solid-state memory, hard drives, optical-disc drives, etc. Computing device 900 includes one or more processors 930 that read data from various entities such as bus 910, memory 920, or I/O components 960. Presentation component(s) 940 present data indications to a user or other device. Exemplary presentation components 940 include a display device, speaker, printing component, vibrating component, etc. I/O ports 950 allow computing device 900 to be logically coupled to other devices, including I/O components 960, some of which may be built in.

In various embodiments, memory 920 includes, in particular, temporal and persistent copies of interaction syndication logic 922. Interaction syndication logic 922 includes instructions that, when executed by one or more processors 930, result in computing device 900 performing various functions, such as, but not limited to, method 500 or 600. In various embodiments, interaction syndication logic 922 includes instructions that, when executed by processor(s) 930, result in computing device 900 performing various functions associated with, but not limited to, direct interaction component 212, indirect interaction component 214, sensing component 222, interaction syndication component 216, rendering component 224, controlling component 232, and feedback component 234 in connection with FIG. 2.

In some embodiments, one or more processors 930 may be packaged together with interaction syndication logic 922. In some embodiments, one or more processors 930 may be packaged together with interaction syndication logic 922 to form a System in Package (SiP). In some embodiments, one or more processors 930 can be integrated on the same die with interaction syndication logic 922. In some embodiments, processors 930 can be integrated on the same die with interaction syndication logic 922 to form a System on Chip (SoC).

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 930 may be direct or via a coupling utilizing a serial port, parallel port, Universal Serial Bus (USB) port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

Computing device 900 may include networking interface 980. The networking interface 980 includes a network interface controller (NIC) that transmits and receives data. The networking interface 980 may use wired technologies (e.g., coaxial cable, twisted pair, optical fiber, etc.) or wireless technologies (e.g., terrestrial microwave, communications satellites, cellular, radio and spread spectrum technologies, etc.). Particularly, the networking interface 980 may include a wireless terminal adapted to receive communications and media over various wireless networks. Computing device 900 may communicate via wireless protocols, such as Code Division Multiple Access (CDMA), Global System for Mobiles (GSM), or Time Division Multiple Access (TDMA), as well as others, to communicate with other devices via the networking interface 980. The radio communications may be a short-range connection, a long-range connection, or a combination of both a short-range and a long-range wireless telecommunications connection. A short-range connection may include a Wi-Fi® connection to a device (e.g., mobile hotspot) that provides access to a wireless communications network, such as a wireless local area network (WLAN) connection using the 802.11 protocol. A Bluetooth connection to another computing device is a second example of a short-range connection. A long-range connection may include a connection using one or more of CDMA, GPRS, GSM, TDMA, and 802.16 protocols.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a head-mounted display unit; however, the head-mounted display unit depicted herein is merely exemplary. Components can be configured for performing novel aspects of embodiments, where "configured for" comprises programmed to perform particular tasks or implement particular abstract data types using code. Further, while embodiments of the present invention may generally refer to the head-mounted display unit and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computing system, comprising:
   a processor and a memory, wherein the processor is configured to:
   receive a first input signal that is generated based on a detected direct interaction that corresponds to a computer-generated object presented in a computer-mediated reality environment, wherein the detected direct interaction is one of a natural or hypernatural interaction;
   receive a second input signal that is generated based on a detected indirect interaction that also corresponds to the computer-generated object, wherein the detected indirect interaction is a controller-based interaction; and
   determine a modification of the computer-generated object based at least in part on a composite command generated from the first input signal that is generated based on the detected direct interaction and the second input signal that is generated based on the detected indirect interaction, wherein the composite command controls at least two aspects of the modification of the computer-generated object.

2. The computing system of claim 1, further comprising:
   a sensing component to generate the first input signal based at least in part on one of a detected hand or finger position in the computer-mediated reality environment or a detected gaze directed to the computer-generated object.

3. The computing system of claim 1, further comprising:
   an input device to generate the second input signal based at least in part on the detected indirect interaction.

4. The computing system of claim 3, wherein the input device comprises a controlling component to generate a measurement signal to be a part of the second input signal, the measurement signal being indicative of a magnitude of the modification of the computer-generated object.

5. The computing system of claim 1, wherein the processor is further configured to determine a characteristic of the detected direct interaction.

6. The computing system of claim 5, wherein the processor is further configured to generate an indication for haptic feedback based at least in part on the characteristic of the detected direct interaction, wherein different types of haptic feedback are associated with different characteristics of the detected direct interaction.

7. The computing system of claim 5, wherein the processor is further configured to determine a plurality of options for the detected indirect interaction based at least in part on the characteristic of the detected direct interaction.

8. The computing system of claim 7, further comprising:
   a head-mounted display device to cause at least one of the plurality of options to be presented in the computer-mediated reality environment.

9. The computing system of claim 1, wherein the at least two aspects of the modification of the computer-generated object comprises a form of the modification and a control parameter of the form, wherein the processor is further configured to determine the form of the modification based on the first input signal, and the control parameter of the form of the modification based on the second input signal.

10. The computing system of claim 1, wherein the processor is further configured to determine an interaction point of the computer-generated object related to the detected direct interaction, and determine a magnification setting related to the interaction point or a rotation setting of the computer-generated object associated with the interaction point.

11. A computer-implemented method, comprising:
    detecting a direct interaction with an object presented in a computer-mediated reality environment, wherein the direct interaction is one of a natural or hypernatural interaction with the object;
    determining an option of an indirect interaction with the object presented in the computer-mediated reality environment based at least in part on a characteristic of the direct interaction with the object, wherein the indirect interaction is a controller-based interaction with the object;
    receiving a signal corresponding to the option of the indirect interaction with the object presented in the computer-mediated reality environment; and
    modifying the computer-mediated reality environment in relation to the object based at least in part on the signal corresponding to the option of the indirect interaction.

12. The method of claim 11, wherein detecting the direct interaction comprises determining that a distance between a body part of a user and the object is within a first predetermined threshold distance, and that the direct interaction is detected for a duration exceeding a second predetermined threshold duration.

13. The method of claim 11, wherein the object is a physical object, and wherein modifying the computer-mediated reality environment comprises augmenting the physical object with a virtual object based at least in part on the signal corresponding to the option of the indirect interaction.

14. The method of claim 11, wherein the object is a virtual object, and wherein modifying the computer-mediated reality environment comprises transforming the virtual object based at least in part on the signal corresponding to the option of the indirect interaction.

15. The method of claim 11, wherein modifying the computer-mediated reality environment comprises transforming the object based at least in part on a form of a transformation indicated by the characteristic of the direct interaction, and a degree of the transformation indicated by the signal corresponding to the option of the indirect interaction.

16. One or more computer storage media having computer-executable instructions embodied thereon that, when executed by one or more processors, causes the one or more processors to:
    detect a direct interaction with a virtual object in a computer-mediated reality environment;
    receive a signal indicating an indirect interaction with the virtual object;
    determine a form of transformation of the virtual object based at least in part on the direct interaction with the virtual object in the computer-mediated reality environment, and a degree of the form of transformation of the virtual object based at least in part on the indirect interaction with the virtual object in the computer-mediated reality environment; and
    modify rendering parameters of the virtual object in the computer-mediated reality environment based on the form and the degree of the form of transformation.

17. The media of claim 16, wherein the instructions further cause the one or more processors to:
    determine the form of transformation to be a linear movement based at least in part on the direct interaction with the virtual object in the computer-mediated reality environment; and determine the degree of the form of transformation to be a distance of the linear movement based at least in part on the indirect interaction with the virtual object in the computer-mediated reality environment.

18. The media of claim 16, wherein the instructions further cause the one or more processors to:
    determine the form of transformation to be a rotation based at least in part on the direct interaction with the virtual object in the computer-mediated reality environment; and determine the degree of the form of transformation to be an angle of the rotation based at least in part on the indirect interaction with the virtual object in the computer-mediated reality environment.

19. The media of claim 16, wherein the instructions further cause the one or more processors to:
    determine the form of transformation to be a magnification based at least in part on the direct interaction with the virtual object in the computer-mediated reality environment; and determine the degree of the form of transformation to be a ratio of the magnification based at least in part on the indirect interaction with the virtual object in the computer-mediated reality environment.

20. The media of claim 16, wherein the instructions further cause the one or more processors to:
    determine the form of transformation to be a deformation based at least in part on the direct interaction with the virtual object in the computer-mediated reality environment; and determine the degree of the form of transformation to be a degree of the deformation based at least in part on the indirect interaction with the virtual object in the computer-mediated reality environment.

* * * * *